United States Patent [19]

Krude

[11] Patent Number: 4,551,116
[45] Date of Patent: Nov. 5, 1985

[54] DRIVE SHAFT ASSEMBLY

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 614,443

[22] Filed: May 25, 1984

[30] Foreign Application Priority Data

Jun. 9, 1983 [DE] Fed. Rep. of Germany ....... 3320760

[51] Int. Cl.$^4$ .......................... F16C 3/02; B60K 17/24
[52] U.S. Cl. ...................................... 464/97; 464/178; 464/181; 464/183
[58] Field of Search .................... 138/109; 308/184 R; 403/50; 464/97, 178, 181, 183

[56] References Cited

U.S. PATENT DOCUMENTS

| 2,162,159 | 6/1939 | Cole | 464/178 X |
| 2,703,109 | 3/1955 | Saville | 138/109 X |
| 3,550,639 | 12/1970 | Okuda | 138/109 X |
| 3,651,661 | 3/1972 | Darrow | 464/181 |
| 4,173,128 | 11/1979 | Corvelli | 464/97 |
| 4,267,863 | 5/1981 | Burelle | 138/109 |
| 4,364,613 | 12/1982 | Mangiavacchi | 308/184 R |
| 4,392,694 | 7/1983 | Reynolds | 308/184 R |
| 4,430,066 | 2/1984 | Benassi | 464/178 |

FOREIGN PATENT DOCUMENTS

| 130065 | 10/1932 | Fed. Rep. of Germany | 464/183 |
| 2087042 | 5/1982 | United Kingdom | 464/181 |

Primary Examiner—Stuart S. Levy
Assistant Examiner—Daniel P. Stodola
Attorney, Agent, or Firm—Toren, McGeady, Stanger, Goldberg & Kiel

[57] ABSTRACT

A drive shaft assembly which consists essentially of two shaft parts both made of fiber reinforced plastic material at least one having a circumferential radially outwardly extending fold formation provided for enabling articulation of the shaft assembly with an intermediate support bearing being located between the two shaft parts, the support bearing having an inner race positioned by steps at the region of connection between the two shaft parts in such a way that the intermediate bearing forms an integral part of the shaft and is assembled so as to form a permanent connection.

6 Claims, 4 Drawing Figures

DRIVE SHAFT ASSEMBLY

The present invention relates generally to torque transmitting devices and more specifically to a drive shaft assembly particularly adapted to be arranged between a pair of rotary elements especially between a transmission and a differential in a motor vehicle.

The shaft is formed to consist essentially of fiber reinforced plastic material and includes at least one formation providing for relative articulation between adjacent parts of the shaft, the formation comprising a circumferential radially outwardly extending fold in the material of the shaft. Such a drive shaft may, particularly, be used for example in a motor vehicle between a gear box and a differential gear thereof.

A drive shaft of the type to which the present invention relates is disclosed in U.S. Pat. No. 4,173,128 wherein the shaft assembly is shown as having several beads which permit limited articulation and which consist of fiber reinforced plastic material. One disadvantage of a drive shaft such as that disclosed in the prior art is that flanges at the ends thereof, by which the shaft is to be connected to rotary elements, are of metal and are connected to the fiber reinforced plastics shaft by connection means such as rivets. Experience has shown that use of different types of materials in components which are subjected to vibration and stress can cause problems because a completely satisfactory permanent connection cannot be achieved. High stresses occur at connecting points which lead to formation of cracks and early failure of the components. A further disadvantage in such prior art devices is that they tend to involve high production costs.

Accordingly, the present invention is directed toward provision of a drive shaft assembly wherein the basic disadvantages of the prior art may be overcome and wherein the shaft assembly may exhibit high bending stress while nevertheless being capable of formation with relatively less expensive materials.

SUMMARY OF THE INVENTION

Briefly, the present invention may be described as a drive shaft assembly for transmitting torque between two relatively movable parts, particularly suitable for use in a motor vehicle between a transmission and a differential thereof comprising: a first shaft part and a second shaft part, each of said shaft parts consisting essentially of the same fiber reinforced plastics material arranged coaxially relatively to each other and permanently secured together; a circumferential radially outwardly extending fold formation formed in at least one of said first and said second shaft parts providing for articulation of said shaft assembly; an integrally formed flange arranged at the opposed ends of said drive shaft assembly, one on each of said shaft parts for enabling said shaft assembly to be connected for torque transmission; and an intermediate support bearing carried on said drive shaft assembly intermediate said opposed ends of said assembly at least adjacent the connection between said first and second shaft parts.

Thus, it will be seen that the basic concepts of the invention are achieved in that there is provided a drive shaft assembly which comprises two shaft parts of the same or similar material composition which are arranged axially adjacent each other and permanently connected together with an intermediate bearing being connected at the joinder of the shaft parts and with fixing flanges being arranged at the opposed ends of the drive shaft assembly formed so as to be an integral part thereof.

An advantage of the drive shaft assembly in accordance with the invention is that by utilizing the same or similar material throughout, it is possible to achieve approximately the same thermal expansion coefficient and almost the same rotational stiffness along the entire length of the shaft. This is accomplished because there are no areas where different materials are connected. In addition, by providing an intermediate support bearing, advantages involving a high degree of natural damping and low weight of fiber reinforced plastic shafts are retained without requiring that the shaft assembly be massively constructed to resist bending. The intermediate bearing permits the use of relatively low strength fibers, for example glass fibers, in place of expensive high strength fibers such as carbon fibers which have been typically proposed for use in shaft assemblies without an intermediate support bearing.

In accordance with a more detailed aspect of the invention, the intermediate support bearing may have an inner bearing ring positioned between step formations formed in the two shaft parts in order to enable the support bearing to be held in an accurately defined position taken relative to the length of the shaft.

The inner bearing ring may be positioned between a step formation provided on one shaft part and another step formation provided on an overlapping connection between the two parts of the shaft. With this design, only one of the shaft parts must be provided with a step while the other shaft part may be of a constant wall thickness and diameter.

Alternatively, both of the shaft parts may include a portion extending into the inner bearing ring, the parts being connected together by an insert disposed within the shaft. As a result, the area of connection between the two shaft parts may be advantageously provided for additional support at the intermediate bearing. In a further possibility, the bearing inner ring may be disposed on an insert disposed wtihin the two shaft parts, the inner bearing ring being abutted by the shaft parts. A universal joint capable of accommodating relative axial movement (a plunging joint) may be associated with the shaft. This will render the shaft suitable for use where large axial movements may occur.

The two shaft parts may be connected to each other by an adhesive substance and it is particularly easy to produce an adhesive joint because both shaft parts are of the same or similar materials and therefore exhibit the same behavior with regard to the adhesive material which is to be utilized. Of course, other possibilities for joining the shaft parts together exist.

The various features of novelty which characterize the invention are pointed out with particularity in the claims annexed to and forming a part of this disclosure. For a better understanding of the invention, it operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
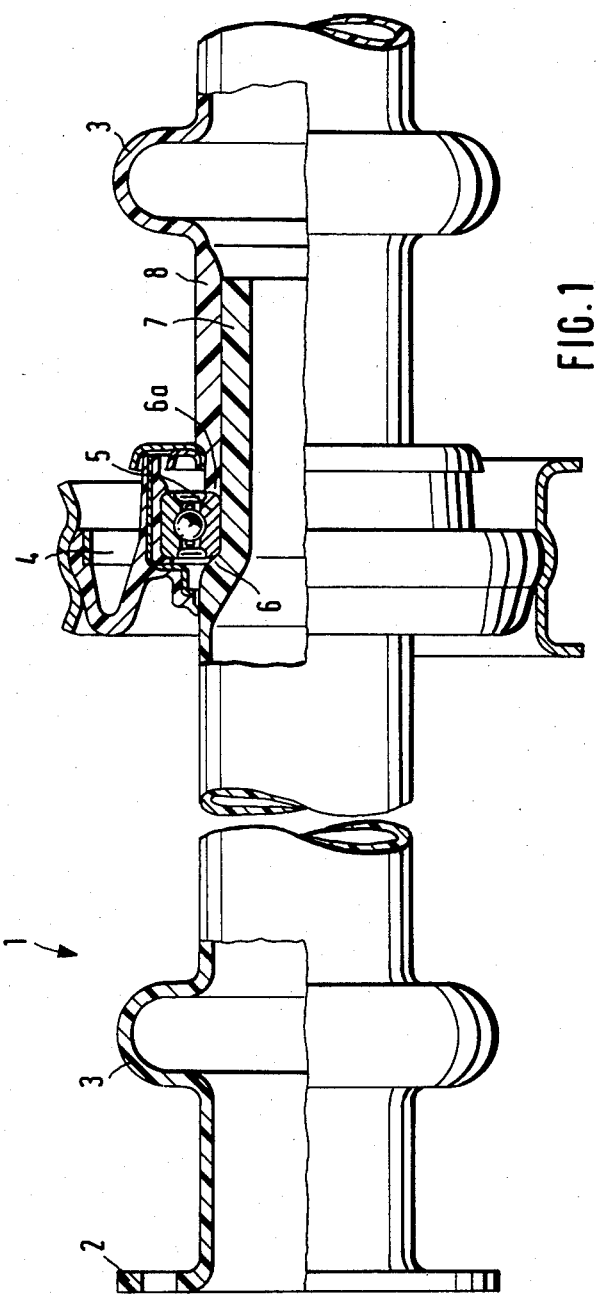
FIG. 1 is a partly sectioned view of a shaft assembly in accordance with the present invention.

Referring to FIG. 1, there is shown a shaft assembly in accordance with the present invention indicated generally by reference numeral 1. The shaft assembly 1 comprises two shaft parts 7 and 8. Both shaft parts 7 and 8 are made of fiber reinforced plastic material and are of a tubular form with the shaft part 7 having a reduced diameter end portion which fits inside the shaft part 8 with the overlapping connection between the two shaft parts having an adhesive which operates to permanently secure the two shaft parts 7 and 8 permanently together.

An intermediate support bearing 4 is provided in the region of the overlapping connection between the two shaft parts, the support bearing including an inner bearing ring 5. The inner bearing ring 5 is positioned between a step 6 on the shaft part 7, which is formed at the point where the diameter of the shaft part 7 reduced to fit within the shaft part 8, and a further step 6a formed by the overlapping free end of the shaft part 8. The intermediate bearing 4 further comprises rolling elements, an outer race and a resilient support structure shown in the drawings.

Each of the shaft parts 7, 8 is formed with a circumferential radially outwardly extending fold or bead formation 3 which provides for a limited degree of articulation between the shaft parts on either side of the formation.

As seen in FIG. 1, the shaft part 7 includes a flange 2 which is integrally formed on the shaft part 7 and which essentially consists of the same fiber reinforced plastic material as the shaft. The flange 2 is adapted to be secured to a rotary torque transmitting element and operates to enable the shaft assembly to be connected for torque transmission.

Figure 2:
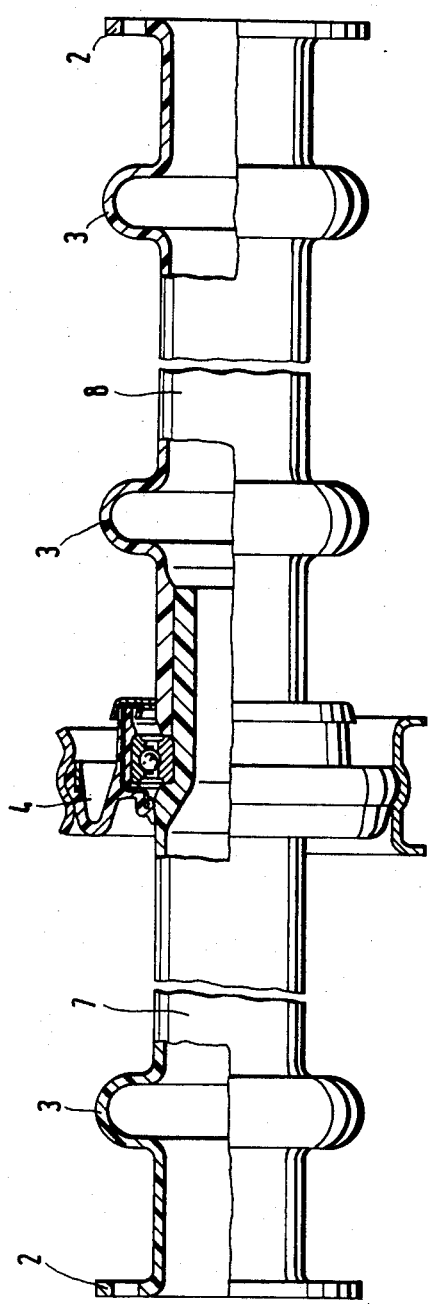
FIG. 2 is a partly sectioned view showing another embodiment of a shaft assembly in accordance with the invention.

Referring now to FIG. 2, there is shown a drive shaft assembly generally similar to that depicted in FIG. 1 except that the shaft part 8 is provided with two fold formations 3 which operate to enable articulation of the shaft assembly. The provision of two such formations provides for a greater degree of articulation of the shaft part 8 as compared with an embodiment where only one such formation is provided. The shaft part 8 in FIG. 2 is also shown as including an integral flange 2 which enables the shaft assembly to be connected for torque transmission. Thus, as will be seen in FIG. 2, the shaft assembly is formed with the flanges 2 at opposed opposite ends thereof.

Figure 3:
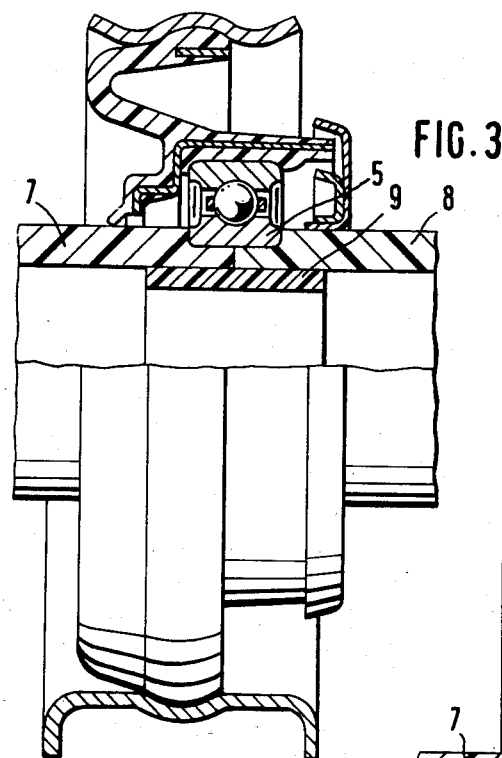
FIG. 3 is a sectional view showing in greater detail an intermediate bearing of the shaft assembly.

With reference to FIG. 3, there is shown an alternative arrangement of the intermediate support bearing for the drive shaft assembly. In the embodiment shown in FIG. 3, the shaft parts 7 and 8 each have the same inside diameter but they are joined by a tubular insert 9 which fits within the contacting ends of the shaft parts. The inner bearing ring 5 of the support bearing is received on the end portions of reduced outside diameter of both of the shaft parts.

Figure 4:
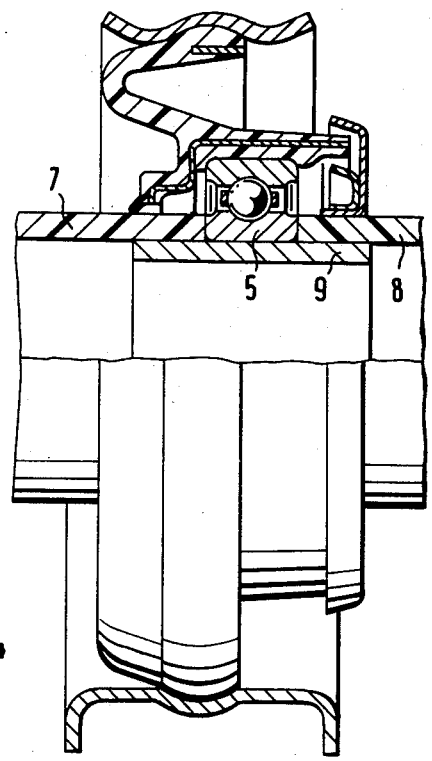
FIG. 4 is a sectional view showing an intermediate bearing for another embodiment of the shaft assembly according to the invention.

In the embodiment shown in FIG. 4, the two shaft parts 7 and 8 are again joined by a tubular insert 9 fitting within the ends thereof. In the case of the embodiment of FIG. 4, however, the inner bearing ring 5 is received on the outside of the insert 9 and is abutted by the ends of the shaft parts 7, 8.

Thus, it will be seen that the present invention provides a drive shaft assembly which may be made completely of fiber reinforced plastic materials and which enables the utilization of relatively inexpensive fiber materials while simultaneously providing a shaft assembly exhibiting high vibration strength.

In accordance with the invention, the objectives thereof are achieved in that the shaft is composed of the two shaft parts 7 and 8 in such a manner that an intermediate bearing which forms an integral part of the shaft assembly is connected so as to form a permanent connection between the shaft parts. The two shaft parts 7 and 8 formed of fiber reinforced plastic material may each be provided with a formation 3 which enable shaft articulation with the support bearing 4 being located intermediate the opposed ends of the shaft assembly where the flanges 2 are provided and having an inner race 5 which is connected in accordance with the invention at the location where the two shaft parts are connected together.

As has been previously indicated, a plunging universal joint may be associated with the drive shaft assembly and the two shaft parts 7 and 8 are connected together by an adhesive or glue.

Of course, it will be appreciated that other connecting means may be provided such as a welded connection.

While specific embodiments of the invention have been shown and described in detail to illustrate the application of the inventive principles, it will be understood that the invention may be embodied otherwise without departing from such principles.

What is claimed is:

1. A drive shaft assembly for transmitting torque between two relatively movable drive and driven members, particularly suitable for use in a motor vehicle between a transmission and a differential, comprising, in combination:

a first tubular shaft part and a second tubular shaft part, each of said shaft parts consisting essentially of the same fiber reinforced plastics material arranged coaxially relative to each other and permanently secured together;

a circumferentially radially outwardly extending fold formation formed in at least one of said first and second shaft parts providing for articulation of said shaft assembly;

an integrally formed flange arranged at the opposed ends of said drive assembly, one on each of said shaft parts for enabling said shaft assembly to be connected for torque transmission; and an intermediate support bearing carried on said drive shaft assembly between said opposed ends at least approximately adjacent the connection between said first and said second shaft parts;

said intermediate support bearing including an inner bearing ring, said first and second shaft parts each having surfaces defining a stepped formation receiving said inner bearing ring.

2. An assembly according to claim 1 wherein said inner bearing ring is positioned between a stepped formation provided on one of said shaft parts and another stepped formation formed by an overlapping connection between said two shaft parts.

3. An assembly according to claim 1 wherein each of said shaft parts includes a portion extending into said inner bearing ring, said assmebly further comprising an insert for connecting said shaft parts to each other, said insert fitting within and overlapping said portions of said shaft parts.

4. An assembly according to claim 1 further comprising an insert member joining said shaft parts together wherein said bearing ring is disposed on said insert member.

5. An assembly according to claim 1 wherein said two shaft parts are permanently connected together by an adhesive.

6. An assembly according to claim 1 wherein said two shaft parts are connected together by fusion.

* * * * *